United States Patent
Morsi et al.

(10) Patent No.: US 8,949,293 B2
(45) Date of Patent: Feb. 3, 2015

(54) AUTOMATICALLY MATCHING DATA SETS WITH STORAGE COMPONENTS

(75) Inventors: Magdi A. Morsi, Bellevue, WA (US); Wai Ho Au, Seattle, WA (US); Ying Sun, Sammamish, WA (US); Sanjeev Katariya, Bellevue, WA (US); Yang Xu, Bellevue, WA (US); Nina Sarawgi, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/972,137

(22) Filed: Dec. 17, 2010

(65) Prior Publication Data

US 2012/0158799 A1    Jun. 21, 2012

(51) Int. Cl.
*G06F 17/30*         (2006.01)
*G06F 11/34*         (2006.01)

(52) U.S. Cl.
CPC ...... *G06F 17/30289* (2013.01); *G06F 11/3485* (2013.01); *G06F 11/3442* (2013.01)
USPC .......................................................... 707/812

(58) Field of Classification Search
CPC .......... G06F 17/30091; G06F 11/1435; G06F 17/30312
USPC ........................................................ 707/812
See application file for complete search history.

(56) References Cited

U.S. PATENT DOCUMENTS 5,018,060 A * 5/1991 Gelb et al. ............................. 1/1
5,485,610 A    1/1996 Gioielli et al.
6,009,428 A   12/1999 Kleewein et al.
6,078,924 A    6/2000 Ainsbury et al.

(Continued)

FOREIGN PATENT DOCUMENTS

CN    1653422 A    8/2005
CN    101171567 A   4/2008

OTHER PUBLICATIONS

"The Benefits of Cloud-based storage, Part 2"—Published Date: Nov. 10, 2008 http://www.infostor.com/index/articles/display/0567106142/articles/infostor/backup-and_recovery/cloud-storage/the-benefits_of_cloud-based.html.

(Continued)

*Primary Examiner* — Rehana Perveen
*Assistant Examiner* — Alexander Khong
(74) *Attorney, Agent, or Firm* — John Jardine; Kate Drakos; Micky Minhas

(57) ABSTRACT

An administrator of an enterprise storage set may be tasked with storing a large number and variety of data sets on a large number and variety of storage components. However, the manual selection of a physical schema by an administrator may be time-consuming, may generate inefficient physical schemata, and may not be easily reevaluated as the data sets and storage set change. Presented herein are techniques for automatically determining a physical schema by comparing the storage factors of each data set (e.g., data size, relationships with other data sets, and usages of the data set by users) with the storage capabilities of the storage components, selecting a suitable storage component, and implementing the storage of the data set on the storage component. An embodiment of these techniques may thereby achieve an automated identification of a physical schema with improved efficiency and flexibility of the physical schema while conserving administrative resources.

20 Claims, 5 Drawing Sheets

(56) References Cited

U.S. PATENT DOCUMENTS

| | | | |
|---|---|---|---|
| 7,216,133 | B2 | 5/2007 | Wu et al. |
| 7,236,992 | B2* | 6/2007 | Yano et al. ............................ 1/1 |
| 2001/0004737 | A1 | 6/2001 | Laux |
| 2003/0225801 | A1* | 12/2003 | Devarakonda et al. ....... 707/205 |
| 2007/0266198 | A1* | 11/2007 | Bousis .............................. 711/4 |
| 2009/0216781 | A1* | 8/2009 | Chauvet et al. ............... 707/100 |
| 2011/0107182 | A1* | 5/2011 | Grube et al. .................. 714/763 |
| 2012/0158669 | A1 | 6/2012 | Morsi et al. |

OTHER PUBLICATIONS

"Business Data Catalog: Architecture"—Published Date: 2007 msdn.microsoft.com/en-us/library/ms499729(office.12).aspx.

"Universal Data Access Components Overview"—Published Date:2008 http://www.devart.com/unidac/.

Chinese Search Report cited in Chinese Application No. 201110426190.X dated Jan. 27, 2014, 2 pgs.

Reply Chinese Search Report cited in Chinese Application No. 201110426190.X dated May 8, 2014, 7 pgs.

Second Chinese Office Action cited in Chinese Application No. 201110426190.X dated Jul. 14, 2014, 3 pgs.

Int. Chinese Supplemental Search Report cited in Chinese Application No. 201110426190.X dated Aug. 4, 2014, 2 pgs.

Third Chinese Office Action cited in Chinese Application No. 201110426190.X dated Dec. 2, 2014, 3 pgs.

* cited by examiner

| STORAGE DEVICE | FREE CAPACITY | ACCESS RATE | REMOTE ACCESS | QUERY CAPABILITY | SECURITY |
| --- | --- | --- | --- | --- | --- |
| DATABASE STORAGE | 300 GB | HIGH | NO | HIGH | MEDIUM |
| SECURED FILE SYSTEM STORAGE | 600 GB | MEDIUM | NO | LOW | HIGH |
| NETWORK FILE SYSTEM STORAGE | 1,200 GB | MEDIUM | YES | LOW | MEDIUM |
| CLOUD STORAGE | 600 GB | LOW | YES | LOW | LOW |
| DATA WAREHOUSE STORAGE | 5,000 GB | LOW | NO | MEDIUM | MEDIUM |

| DATA SET | STORAGE FACTORS | SELECTED STORAGE COMPONENT |
| --- | --- | --- |
| DATABASE 1 | QUERYABLE | DATABASE STORAGE |
| DATABASE 2 | QUERYABLE; ASSOCIATED WITH DATABASE 1 | DATABASE STORAGE |
| MEDICAL RECORDS | HIGH SENSITIVITY | SECURED FILE SYSTEM STORAGE |
| EMAIL MAILBOX | LARGE SIZE; REMOTE ACCESS | NETWORK FILE SYSTEM STORAGE |
| RESEARCH DATA | LARGE SIZE; QUERYABLE | DATA WAREHOUSE STORAGE |

FIG. 2

AUTOMATICALLY MATCHING DATA SETS WITH STORAGE COMPONENTS

BACKGROUND

Within the field of computing, many scenarios involve two or more data sets that are to be stored among two or more storage components. For example, administrators of an enterprise information technology environment for a large company may be tasked with configuring a storage set, comprising a set of storage components to store a large number of data sets on behalf of a large number of users. This task may be complicated, e.g., by the large variety of storage components comprising the storage set (e.g., database servers, network file systems, archival systems and data warehouses, and cloud storage services), the properties and features of the different storage components (e.g., total and available storage capacity, bandwidth and throughput, querying capabilities, and security), and the variety and properties of the data sets (e.g., data set size, relationships with other data sets, and uses of the data sets by the users of the enterprise organization). In many contemporary scenarios, the administrator may first examine the data sets and determine a conceptual and/or logical schema, and may consider the relationships and usages of the data sets, and may then have to select a physical schema for the storage of the data sets, e.g., by choosing a storage component having suitable features matching the properties of the data set, provisioning storage on the storage component, and initiating the storage of the data set by the storage component. The administrator may then have to implement the storage selection, e.g., by provisioning storage on the selected storage components, configuring devices and software processes to utilize the provisioned storage component, storing the data onto the storage component, and instructing other users regarding the storage component. Additionally, the administrator may have to reevaluate of the selections of storage components for data sets as the number and details of the data sets and/or the storage set change.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While an administrator may adequately select storage components to match various data sets, a manual selection of storage components may have some disadvantages. As a first example, the selection of a physical schema may consume the attention and resources of the administrator, and may involve a significant amount of administrative attention of the administrator to design, implement, and maintain. As a second example, a manual design of a physical schema may be inefficient in several respects (e.g., failing to utilize the storage capacities and features of the storage set with high efficiency), particularly as the number, variety, and complexity of storage components and/or data sets increases. As a third example, an administrator may be reluctant to reevaluate a manually designed physical schema, e.g., in view of changes in the data sets and/or the storage set, including an addition or removal of storage components.

Presented herein are techniques for automatically selecting storage components of a storage set in order to store a potentially large number and variety of data sets. In accordance with these techniques, for each storage component, a set of storage capabilities may be identified (e.g., available storage capacity, bandwidth, a capability of executing queries, remote accessibility, and a security level), and for each data set, a set of storage factors may be identified (e.g., the estimated size of the data set, the structure and content of the data set, whether or not users are likely to execute simple or complex queries against the data set, whether or not users are likely to access the data set remotely, and a sensitivity level of the data comprising the data set). When presented with a particular data set, an embodiment of these techniques may compare the storage capabilities of the storage components with the storage factors of the data set, automatically select a suitable storage component, provision space on the storage component to store the data set, and initiate the storage of the data set in that storage component. In this manner, a physical schema for storing the data sets within the storage set may be automatically generated, thereby conserving the attention of administrators, achieving a highly efficient and suitable physical schema, and enabling a reevaluation and reconfiguration of the physical schema as the data sets and/or storage set change.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is a flow chart illustrating an exemplary scenario featuring an automated generation of a physical schema to store data sets on storage components of a storage set.

DETAILED DESCRIPTION

Figure 1:
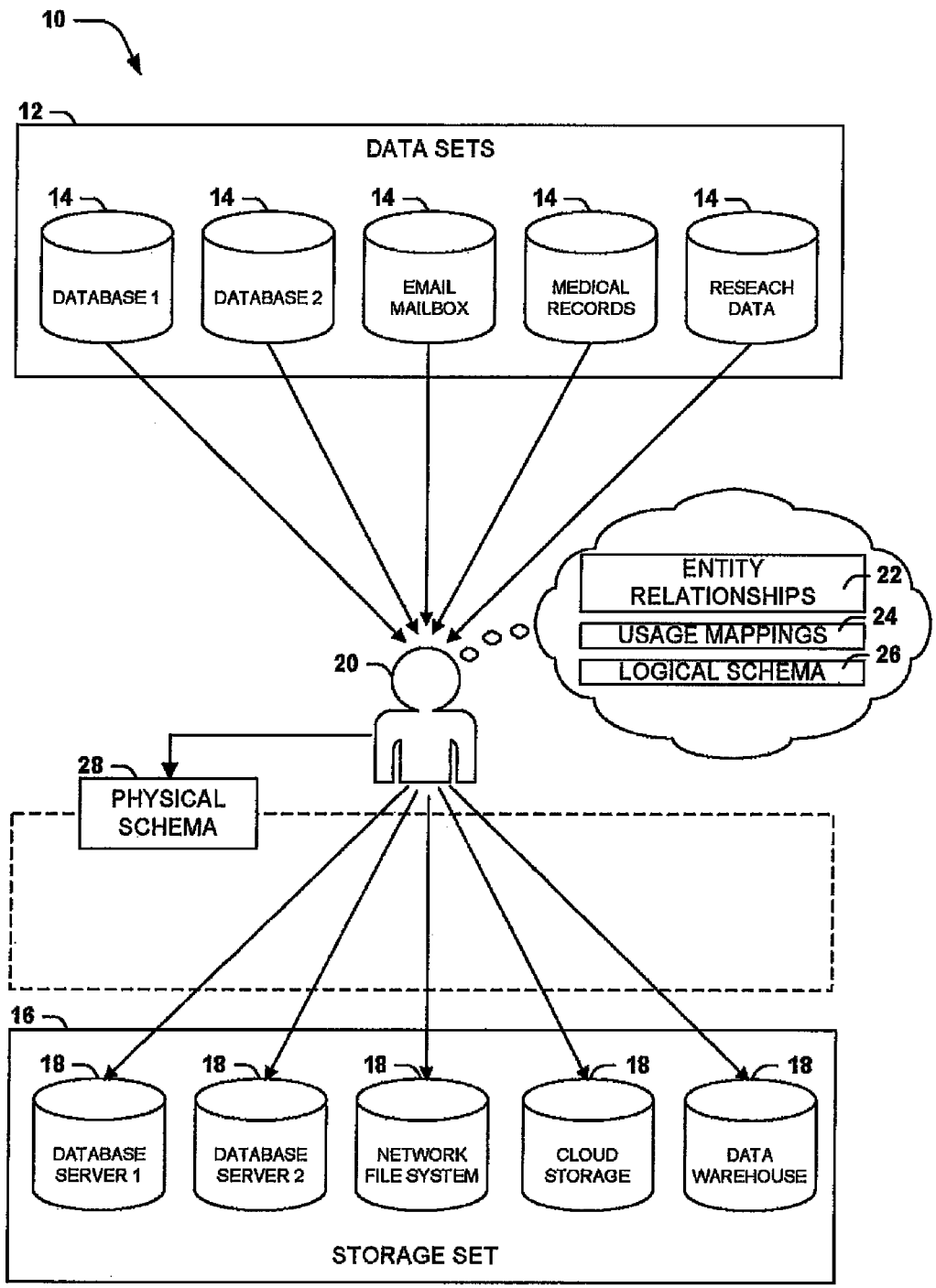
FIG. 1 is a flow chart illustrating an exemplary scenario featuring a physical schema selected by a user to store data sets on storage components of a storage set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the storage of data within a storage set comprising one or more storage components, such as a set of one or more hard disk drives, solid-state storage devices, tape backup drives, memory caches, network-attached storage devices, virtual storage devices, cloud storage services, or a combination thereof. On such storage components, many types of data may be stored in many types of storage systems, such as various types of file systems and database systems. Particularly in enterprise scenarios, these storage sets may scale up to include very large amounts of storage (possibly reaching many petabytes or exabytes) and very large numbers of storage components. Each storage component may have various storage capabilities, including physical properties, such as capacity, throughput, and reliability (e.g., mean time between failures (MTBF) and the ease of recovering from data failure), and usage properties, such as security (e.g., who administrates and may physically access the storage component) and backup (e.g., how often data archiving of the storage component is performed). Additionally, such storage capabilities may be Boolean or gradient in nature (e.g., whether or not a particular storage component provides support for queries such as Structured Query Language (SQL), vs. the per-megabyte cost of acquiring and expanding each storage component).

These storage devices may be used to store many types of data, including files comprising an operating environment of a computer, personal documents, media libraries, records in one or more database tables, and email mailboxes comprising sets of email messages. Each data set may have particular storage factors, such as a data size, access patterns (e.g., sequential, streaming, or random access, large or small numbers of individual units such as files, concurrent access by several users, and support for queries, and minimum acceptable access rates, such as minimum rates for streaming media objects without interruption), security (e.g., security considerations for where the data may be stored, who may access the data, the types of credentials to be presented before granting access, and the sensitivity of the data), and accessibility (e.g., whether the data is to be restricted to local access over a local area network or ubiquitously available). Again, such storage factors may be Boolean or gradient in nature (e.g., whether a particular data set involves queries, and an estimate of the advantage of providing higher throughout for a particular data set).

Within such complex scenarios, the task of administrating the storage set becomes nontrivial, and administrators may have to spend considerable effort and resources in acquiring, configuring, testing, and maintaining such storage components, as well as identifying, provisioning, and backing up sets of data stored on each component. In particular, the task of selecting a storage component for a particular data set may be complex. This task often involves identifying the various storage factors for a data set and matching the storage factors with a storage component featuring storage characteristics that match the storage factors of the data set. Once a data component has been selected, the administrator may have to provision a sufficient amount of storage on the storage component (e.g., creating a storage volume on the storage component), record the selection in a storage catalog, and configure devices and instruct individuals in accessing the provisioned storage.

FIG. 1 presents an exemplary scenario 10 featuring a user 20 tasked with allocating storage for a data set group 12, comprising a number of data sets 14, to a storage set 16 comprising a number of storage components 18. For a scenario such as a research hospital, the data sets 14 may include, e.g., one or more databases; one or more email mailboxes; a set of medical records; and a set of research data. Moreover, each data set 14 may have various storage factors that may influence the selection of a storage component 18. For example, the databases may have to be stored on a storage component that supports transactional capabilities; a set of email mailboxes may have to be stored on a storage component that supports vastly concurrent access by a large number of users; the medical records may have to be stored on a highly secured server in order to satisfy various legal and regulatory provisions; and the research data may have to be stored on a storage component supporting very large amounts of data (e.g., terabyte-size data sets). Additionally, each storage component 18 in the storage set 16 may have various storage capabilities, including features and limitations, to be considered when provisioning storage thereupon for any particular data set 14. For example, the database servers may provide support for transactional accesses, but may involve comparatively complicated administration, and may not be remotely accessible. The network file system may offer very large storage capabilities to many users, but may not support transactional capabilities. The cloud storage service may provide ubiquitous access to data, but may offer comparatively limited throughout over the internet. A data warehouse may offer very copious storage, but may not be highly secured.

Faced with such storage factors of the data sets 14 and such storage capabilities of such storage components 18, the user 20 may be presented with the task of selecting a suitable storage component 18 for each data set 14. The user 20 may therefore evaluate various properties of the storage selection, such as the entity relationships 22 (e.g., relationships of data in a first data set 14 with data in a second data set 14), usage mappings 24 (e.g., considerations of the usage patterns of each data set 14, such as the locations of users and processes that will access the data set 14 and the access patterns of such usage), and logical schema 26 (e.g., the components of each data set 14, such as the sizes, types, and interrelationships of files within a file system or tables in a relational database).

As a result of these considerations, the user 20 may generate a physical schema 28, comprising a mapping of the data sets 14 to the storage components 18, based on the matching of storage factors of the data sets 14 with the storage capabilities of the storage components 18. The user 20 may then have to implement the selected physical schema 28 by provisioning storage on the storage component 18 (e.g., creating a logical volume and setting up access parameters), recording the provisioning in a storage catalog, configuring devices and software processes to use the provisioned storage, and notifying and instructing other users 20 in the details of the allocated storage. Additionally, the user 20 may have to perform various maintenance tasks, such as archiving or backing up the storage components 18, periodically testing the integrity of the storage components 18, upgrading storage components 18 to provide more capacity, and replacing malfunctioning hardware.

It may be appreciated that the exemplary scenario 10 of FIG. 1 involves a significant amount of effort on the part of the user 20, particularly as the number and variety of data sets 14 and the number and variety of storage components 18 increase. The process of matching data sets 14 to suitable storage components 18 and implementing such selections may involve large amounts of skill and resources, and inefficient decisions may result in wasted resources, data loss, and inadequate performance (e.g., slow network transfer rates and inadequate storage capacity). Moreover, once a physical schema 28 has been selected, the reevaluation of the physical schema 28 may present a daunting challenge. For example, reevaluating reallocating storage in view of changes to the data set group 12 and the storage set 18 (e.g., the addition of new data sets 14 and/or new storage components 18) may comprise a difficult and resource-intensive process, particularly for a large number of data sets 14 and storage components 18. Even if this process is desirable, the resources involved in evaluating the physical schema 28, reconfiguring storage components 18, moving data among storage components 18, reconfiguring devices and software processes, and reinstructing other users 20 may simply not be cost-effective. As a result, inefficiencies may arise in the physical schema 28 that reduce the performance, capabilities, and usage of the storage set 16.

Presented herein are techniques for facilitating, reducing, or eliminating the selection of a physical schema 28 by a user 20. In accordance with the techniques presented herein, an automated matching process may be devised to, for each data set 14 having particular storage factors, automatically select a storage component 18 presenting suitable storage characteristics. In general, the problem of selecting the physical schema 28 may be viewed as a best-fit problem, wherein elements having different sizes, shapes, and properties are to be arranged in one or more storage containers having various properties. Accordingly, the process of matching data sets 14 to storage components 18 may be automatically resolved using various best-fit techniques. The matchings may be recorded in a storage catalog, which may comprise a storage catalog describing the storage set 16, the data sets 14 stored on each storage set 16, and the rationale for choosing such selections. Therefore, and according to the techniques presented herein, an automated matching of data sets 14 with storage components 18 may be performed to achieve a more suitable physical schema 28 in a more efficient manner than may be selected by a user 20, resulting in improved throughput, greater available capacity, and/or reduced costs. Moreover, the selection may be automatically implemented by provisioning storage on each storage component 18 and configuring devices and software processes to use the provisioned storage (e.g., automatically configuring network mappings on computers to point to correct volumes). As still further advantages, an automated process may be able to identify the storage capabilities of the storage components 18 (e.g., identifying the throughput of each storage component 18 through bandwidth testing), and to reevaluate the physical schema 28 in view of changes in the data set group 12 and the storage set 16 (e.g., identifying changes to the physical schema 28 that may present various improvements in the performance of the storage set 16, and even implementing such changes). Indeed, once a user 20 creates a representation of the data factors of the data sets 14, the automated process may be able to handle the entire process of choosing, implementing, and continuously reevaluating the physical schema 28, thereby achieving significant improvements in the performance of the storage set 16 and at much lower administrative costs.

FIG. 2 presents an exemplary scenario 30 featuring an automated mapping of a data set group 12 comprising various data sets 14 to a storage set 16 comprising various storage components 18. In this exemplary scenario 30, the data sets 14 may be identified as having various storage factors 32. Such storage factors 32 may be based on various entity relationships 22 (e.g., a second database that relationally depends upon a first database); various usage mappings 24 (e.g., a particular database may be often used by an application executing on a particular server, and a set of email mailboxes may have to be remotely accessible via the internet); and various logical schema 26 (e.g., research data may comprise a small set of very large files, while an email mailbox may comprises a very large set of small files). Many other considerations may also be included in the storage factors 32 for various data sets 14. For example, a set of medical records may be highly sensitive (e.g., subject to various privacy regulations, such as Heath Information Portability and Accountability Act (HIPAA), and may therefore have to be stored on a highly secured server with restricted physical access). Additionally, the storage components 18 may feature various storage capabilities 34, such as total and available capacity, an access rate (e.g., local-area and wide-area throughput measured in both upload and download capacity), remote access, query capabilities, and security considerations. In view of these storage factors 32 and storage capabilities 34, an automated matching may be performed to generate a physical schema 28 identifying, for each data set 14, one or more storage components 18 wherein the data set 14 is to be stored. The matchings may be recorded in a storage catalog 36, which may comprise a storage catalog describing the storage set 16, the data sets 14 stored on each storage set 16, and the rationale for choosing such selections. Additionally, an automated process may, after selecting the physical schema 28, automatically implement the physical schema 28 on the storage components 18 and/or data sets 14, e.g., by configuring devices, acquiring services, and storing or relocating data sets 14 there among.

Figure 3:
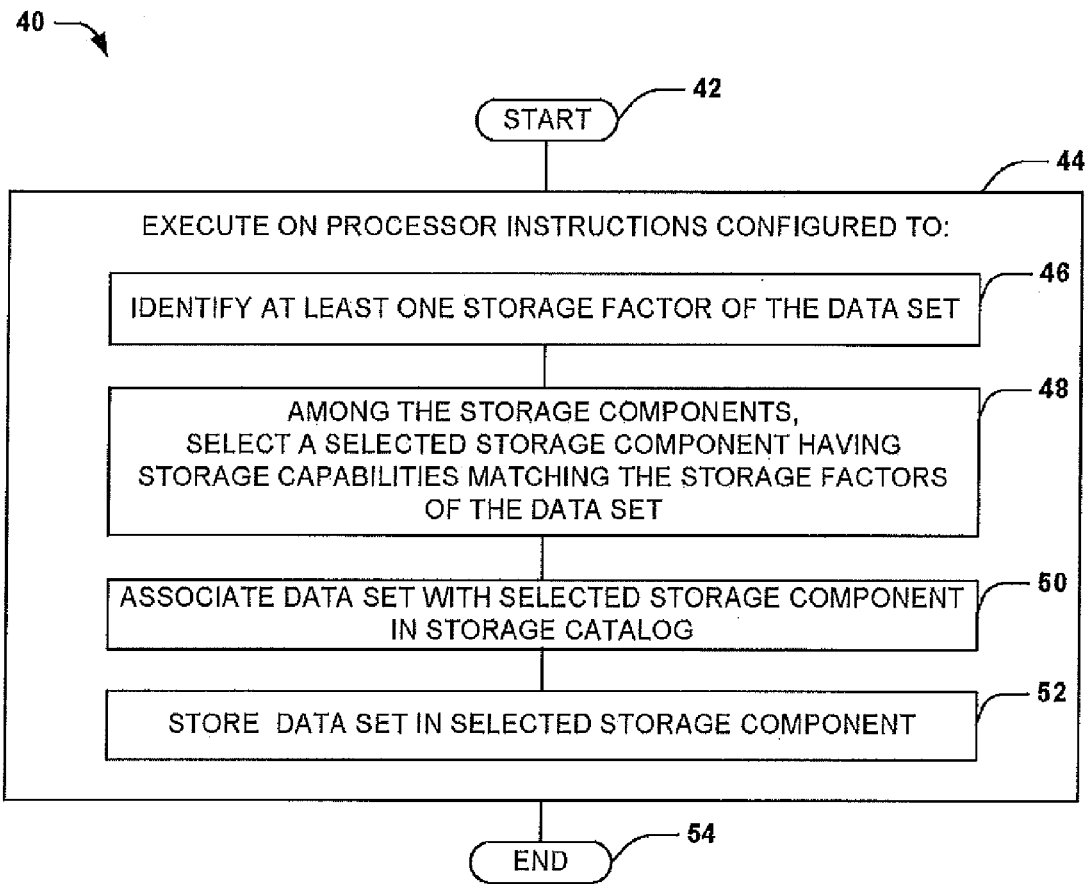
FIG. 3 is a flow chart illustrating an exemplary method of storing a data set in a storage set.

FIG. 3 presents a first embodiment of these techniques, illustrated as an exemplary method 40 of storing a data set 14 having at least one storage factor 32 in a storage set 16 comprising at least two storage components 18 respectively having at least one storage capability 34. The exemplary method 40 may be implemented, e.g., as a set of software instructions stored in a memory component (e.g., a system memory circuit, a platter of a hard disk drive, a solid state storage device, or a magnetic or optical disc) of a device having a processor, that, when executed by the processor of the device, cause the processor to perform the techniques presented herein. The exemplary method 40 begins at 42 and involves executing 44 the instructions on the processor. More specifically, the instructions are configured to identify 46 at least one storage factor 32 of the data set 14. The instructions are also configured to, among the storage components 18, select 48 a selected storage component 18 having storage capabilities 34 matching the storage factors 32 of the data set 14. The instructions are also configured to associate 50 the data set 14 with the selected storage component 18 in the storage catalog 36, and store 52 the data set 14 in the selected storage component 18. In this manner, the exemplary method 40 performs and implemented an automated selection of storage of various data sets 14 on the storage components 18 of the storage set 16, and so ends at 54.

Figure 4:
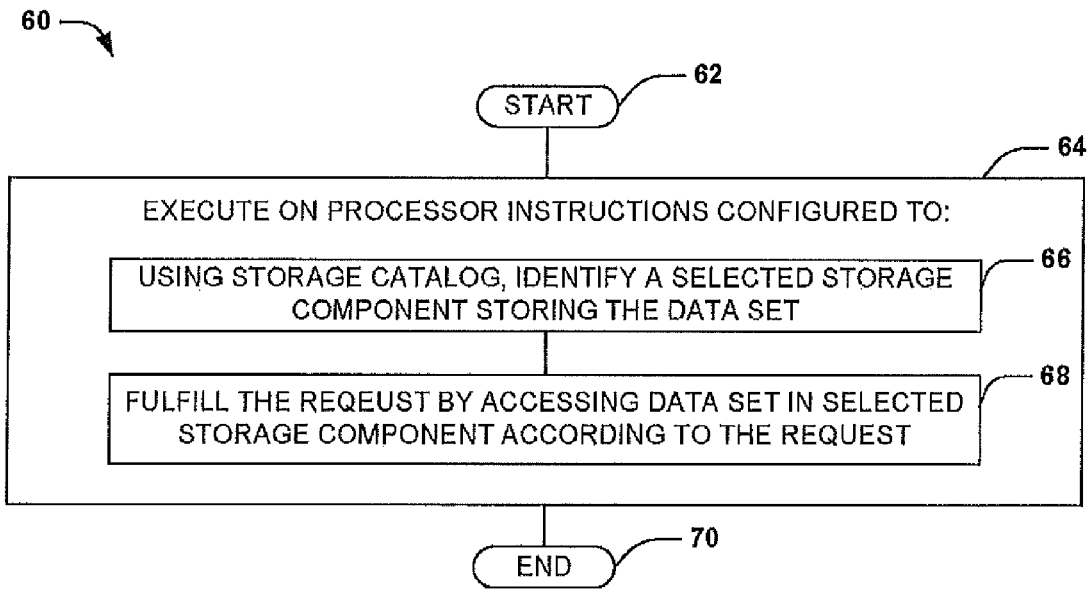
FIG. 4 is a flow chart illustrating an exemplary method of storing a data set in a storage set.

FIG. 4 presents a second embodiment of these techniques, illustrated as an exemplary method 60 of fulfilling a request to access a data set 14 stored in a storage set 16. The exemplary method 60 may be implemented, e.g., as a set of software instructions stored in a memory component (e.g., a system memory circuit, a platter of a hard disk drive, a solid state storage device, or a magnetic or optical disc) of a device having a processor, that, when executed by the processor of the device, cause the processor to perform the techniques presented herein. The exemplary method 60 begins at 62 and involves executing 64 the instructions on the processor. More specifically, the instructions are configured to, using the storage catalog 36, identify 66 a selected storage component 18 that is storing the data set 14. The instructions are also configured to fulfill 68 the request by accessing the data set 14 in the selected storage component 18 according to the request. Having achieved the retrieval and provision of the data set 14 from the storage set 16 in response to the request, the exemplary method 60 ends at 70.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
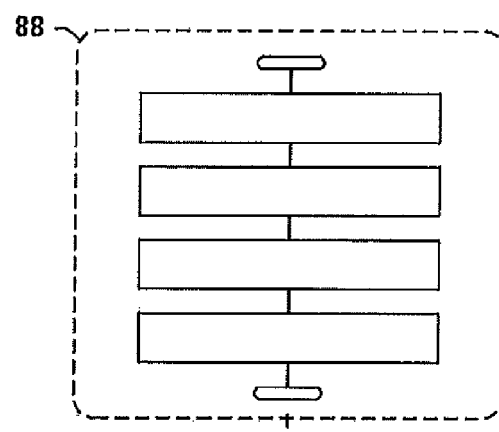
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of storing a data set in a storage set, such as the exemplary method 40 of FIG. 3. In another such embodiment, the processor-executable instructions 86 may be configured to implement a system for storing a data set in a storage set, such as the exemplary method 60 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary method 60 of FIG. 4) to confer individual and/or synergistic advantages upon such embodiments.

A first aspect that may vary among embodiments of these techniques relates to the scenarios wherein such techniques may be utilized. As a first variation, these techniques may be utilized to store a large variety of data sets 14, including files comprising an operating environment of a computer, personal documents, media libraries, records in one or more database tables, and email mailboxes comprising sets of email messages. Additionally, such data sets 14 may comprise a wide variety of storage factors 16 selected from a storage factor set, such as a data set size factor (e.g., the total current or predicted size of the data set 14); a data set type factor (e.g., the type of data stored in the data set); a data set querying factor (e.g., whether or not queries of various types are to be applied to the data set 14); a data set access rate factor (e.g., the minimum acceptable access rate of the data set 14); and a data set security factor (e.g., the minimum degree and nature of security to be applied to the data set 14).

As a second variation of this first aspect, these techniques may be utilized to store such data sets 14 on a wide variety of storage components 18 (e.g., hard disk drives, solid-state storage systems, high-performance memory circuits, cloud storage services, and tape archives). Such storage components 18 may feature various types of file systems (e.g., disk file systems and network file systems) and/or protocols (e.g., a File Transfer Protocol (FTP), Server Message Block (SMB), Hypertext Transfer Protocol (HTTP), and Web-Based Distributed Authoring and Versioning (WebDAV)). Such storage components 18 may also comprise database servers configured to store various types of relational and/or non-relational databases comprising various types of database objects, such as records, tables, relationships, and stored procedures, and email servers configured to store email messages in email mailboxes. These storage components 18 may also feature various types of storage capabilities 34 selected from a storage capability set, including various types of features, such as a storage component type factor (e.g., the type of the storage component 18); a storage capacity factor (e.g., the total, available, or achievable storage capacity of the storage component 18); a storage access rate factor (e.g., the achievable rates of upload and download access and latency to the storage component 18); a storage querying interface factor (e.g., whether or not the storage component 18 supports various types of queries); and a storage security factor (e.g., the degree and details of security of the storage component 18, such as encryption and user authentication.) The details of such storage capabilities 34 may include factors other than the device (e.g., the storage access rate factor may be limited to the achievable throughput of the network connecting the storage component 18 to an end user, and the storage security factor may include social policies, such as which individuals of an organization are permitted physical access to the storage component 18). Those of ordinary skill in the art may devise many types of data sets 14 and storage components 18 to which the techniques presented herein may be applied.

A second aspect that may vary among embodiments of these techniques relates to the manner of identifying the storage capabilities 34 of a particular storage component 16. As a first variation, a user 20, such as an administrator, may specify to an embodiment the storage capabilities of the storage component 16. As a second variation, a storage component 16 may indicate to an embodiment the storage capabilities of the storage component 16. For example, the storage component 16 may be able to report its storage capabilities 34, such as a set of supported protocols. As a third variation, an embodiment may identify the storage capabilities 34 of a storage component 16 through detection or monitoring. For example, an embodiment may perform various throughput tests on a storage component to determine its practical sustainable throughput rate within the computing environment. Alternatively, an embodiment may have access to a storage log comprising storage events involving at least one storage component (e.g., records of data transfers performed over a network), and may be able to evaluate the storage log to identify the storage capabilities 34 of the storage components 18. Those of ordinary skill in the art may devise many ways of identifying the storage capabilities 34 of various storage components 18 in accordance with the techniques presented herein.

A third aspect that may vary among embodiments of these techniques involves the manner of selecting a storage component 18 to store any particular data set 14. As a first variation, the matching may involve many types of heuristics that compare the storage factors 32 of the data set 14 with the storage capabilities 34 of respective storage components 18 to make a suitable match. As a first example, the data set 14 may comprise a first entity that has a relationship with a second entity stored in a second data set (e.g., a dependency between software objects, a resource embedded in a document or application, a data-driven software application and a corresponding data set, or an interrelationship between relational database tables). An embodiment of these techniques may be able to identify the entity relationship between these entities, and may utilize this relationship as a storage factor 32 of the storage set 16, such as a heuristic specifying a storing together of the data sets 14 having the entity relationship on the same storage component 18. As a second example, a data set 14 may have a particular usage mapping, such as a set of users or software processes that utilize the data set 14 or an access pattern describing the manner in which the data set 14 may be accessed. The device may therefore utilize this usage mapping as a storage factor 32 of the storage set 16, such as a heuristic specifying a selection of a storage device 18 that not only meets the minimum criteria of the data set 14, but that facilitates the usage mapping, e.g., by facilitating the usage mappings. As a third examine, a data set 14 may have a particular logical schema. For example, the logical schema may define that a data set 14 comprises two or more data set components, such as a file system having subsets of files hierarchically organized into folders or a database comprising a set of tables. The device may therefore utilize this logical schema as a storage factor 32 of the storage set 16, such as a heuristic specifying that a first storage component is to be stored on a first storage component 18, while a second storage component is to be stored on a second storage component 18 that is different from the first storage component.

As a second variation of this third aspect, rather than choosing storage components 18 on an ad hoc basis for each data set 14, an embodiment may holistically evaluate the data set group 12 and the storage set 16 in order to identify a physical schema 28. As one such example, the embodiment may invoke a best-fit selection heuristic to choose the physical schema 28. For example, the best-fit selection heuristic may first select storage components 18 for the data sets 14 having large or specialized storage factors 32 (e.g., very large data sets 14, data sets 14 involving high concurrency or having usage mappings involving high access rates, or highly sensitive data sets 14), and may then select storage components 18 for the data sets 14 having smaller and more generalized storage factors 32 (e.g., small data sets 14 that are accessed in general ways and that may be placed anywhere). Those of ordinary skill in the art may devise many ways of selecting storage components 18 for data sets 14 in accordance with the techniques presented herein.

A fourth aspect that may vary among embodiments of these techniques involves the manner of implementing a physical schema 28 selected for a data set group 12 and a storage set 16. As a first variation, an embodiment may automatically implement the physical schema 28, e.g., by automatically provisioning storage on the storage components 18 for assigned data sets 14 and automatically configuring devices and software processes to utilize the provisioned storage component 18. Alternatively, the embodiment may inform one or more users 20 (e.g., administrators) of the physical schema 28 (e.g., by providing the storage catalog 36 to the user 20), and possibly with instructions for implementing the physical schema 28 on the storage components 18.

As a second variation, an embodiment of these techniques may participate in the implementation, e.g., by persistently connecting data consumers (e.g., data-driven applications) to data components 18 wherein the data sets 14 are stored. As a first such example, an embodiment may store different data set components of a data set 14 on different storage components 18, or may store two data sets 14 having a relationship on two different storage components 18. When a user 20 or application presents a request (such as a query) specifying the data set 14, the embodiment may represent the data set 14 as a unified data set 14, e.g., by contacting the first storage component 14 and the second storage component 14, accessing the data set 18 stored on each storage component 14 (e.g., retrieving a first data subset from the first storage component 14 and a second data subset from the second storage component 14), and aggregating the responses or data to present the user 20 or application with a combined result set (e.g., a single query response or a single data set 18). Those of ordinary skill in the art may devise many ways of involving an embodiment in these techniques in the implementation of the automatically selected physical schema 28 in accordance with the techniques presented herein.

A fifth aspect that may vary among embodiments of these techniques involves the updating of the storage catalog 36 to reflect changes in the data set group 12 and/or the storage set 16. As a first example, upon receiving a notification of an added storage component 18, an embodiment may detect at least one storage capability 34 of the added storage component 18, and may represent the added storage component 18 in the storage catalog 36. Conversely, upon receiving a notification of a removed storage component 18, an embodiment may remove the removed storage component 18 from the storage catalog 36 (optionally relocating any data sets 14 stored therein to other storage components 18).

As a second variation of this fifth aspect, an embodiment may occasionally reevaluate the storage catalog 36 to identify potential improvements. For example, after storing a data set 14 on a storage component 18, an embodiment may compare the storage capabilities 32 of the selected storage component 18 for storing the data set 14 with the storage capabilities 32 of other storage components 18 of the storage set 16, and upon identifying a second storage component 18 having storage capabilities 34 having a higher match with the storage factors 32 of the data set than the storage capabilities 34 of the selected storage component 18, may relocate the data set 14 to the second storage component 18 and update the storage catalog 36 to associate the data set 14 with the second storage component 18. This reevaluation may be performed occasionally (e.g., periodically or upon detecting a change to the data set group 12 and/or the storage set 16) in order to identify potential improvements therein that may improve the available capacities or performance of the storage set 16. Those of ordinary skill in the art may devise many ways of configuring an embodiment of these techniques to update the data catalog 36 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
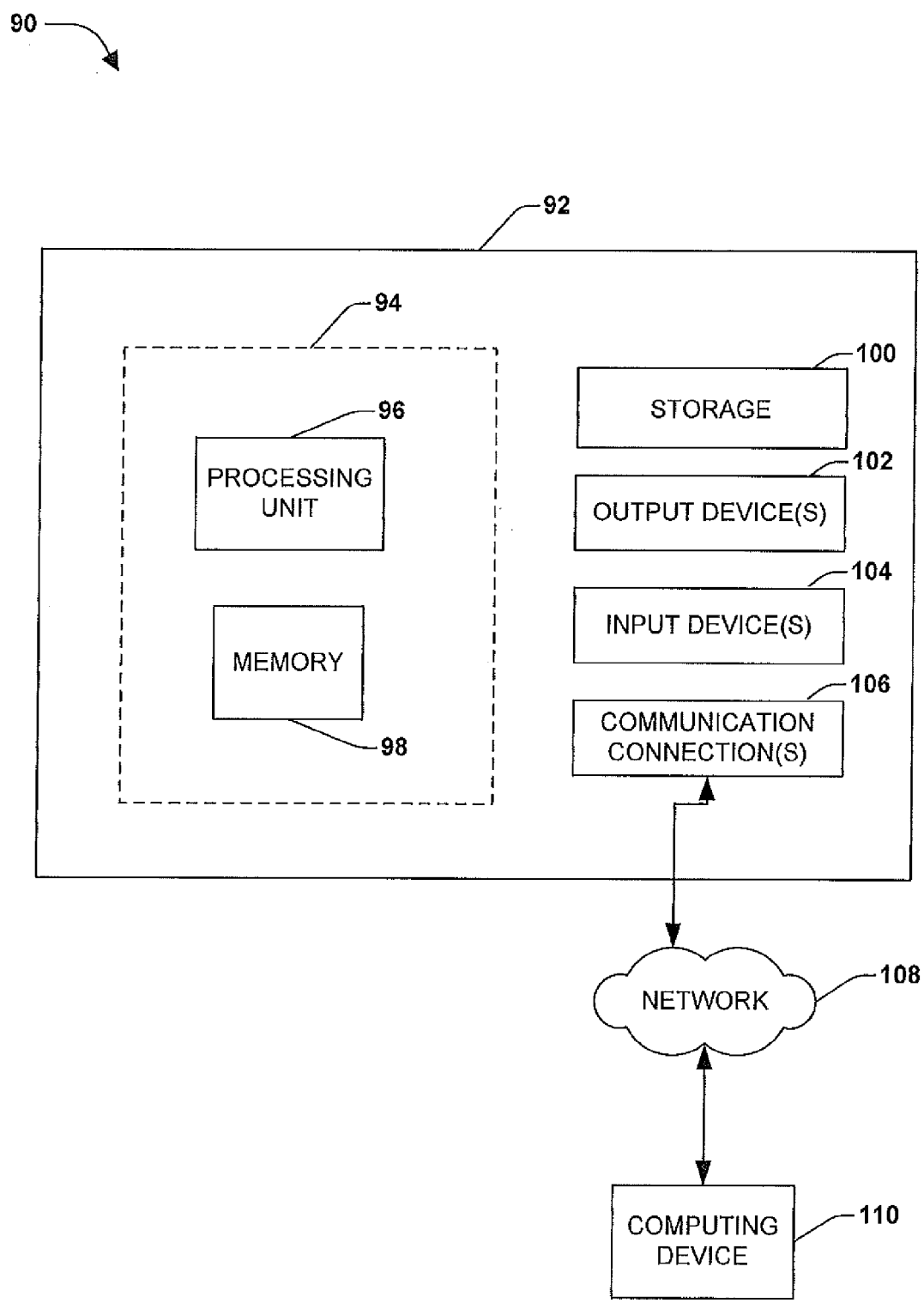
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 90 comprising a computing device 92 configured to implement one or more embodiments provided herein. In one configuration, computing device 92 includes at least one processing unit 96 and memory 98. Depending on the exact configuration and type of computing device, memory 98 may be volatile (such as RAM, for example), non-volatile (such as ROM, flash memory, etc., for example) or some combination of the two. This configuration is illustrated in FIG. 6 by dashed line 94.

In other embodiments, device 92 may include additional features and/or functionality. For example, device 92 may also include additional storage (e.g., removable and/or non-removable) including, but not limited to, magnetic storage, optical storage, and the like. Such additional storage is illustrated in FIG. 6 by storage 100. In one embodiment, computer readable instructions to implement one or more embodiments provided herein may be in storage 100. Storage 100 may also store other computer readable instructions to implement an operating system, an application program, and the like. Computer readable instructions may be loaded in memory 98 for execution by processing unit 96, for example.

The term "computer readable media" as used herein includes computer storage media. Computer storage media includes volatile and nonvolatile, removable and non-removable media implemented in any method or technology for storage of information such as computer readable instructions or other data. Memory 98 and storage 100 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 92. Any such computer storage media may be part of device 92.

Device 92 may also include communication connection(s) 106 that allows device 92 to communicate with other devices. Communication connection(s) 106 may include, but is not limited to, a modem, a Network Interface Card (NIC), an integrated network interface, a radio frequency transmitter/receiver, an infrared port, a USB connection, or other interfaces for connecting computing device 92 to other computing devices. Communication connection(s) 106 may include a wired connection or a wireless connection. Communication connection(s) 106 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 92 may include input device(s) 104 such as keyboard, mouse, pen, voice input device, touch input device, infrared cameras, video input devices, and/or any other input device. Output device(s) 102 such as one or more displays, speakers, printers, and/or any other output device may also be included in device 92. Input device(s) 104 and output device(s) 102 may be connected to device 92 via a wired connection, wireless connection, or any combination thereof. In one embodiment, an input device or an output device from another computing device may be used as input device(s) 104 or output device(s) 102 for computing device 92.

Components of computing device 92 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 92 may be interconnected by a network. For example, memory 98 may be comprised of multiple physical memory units located in different physical locations interconnected by a network.

Those skilled in the art will realize that storage devices utilized to store computer readable instructions may be distributed across a network. For example, a computing device 110 accessible via network 108 may store computer readable instructions to implement one or more embodiments provided herein. Computing device 92 may access computing device 110 and download a part or all of the computer readable instructions for execution. Alternatively, computing device 92 may download pieces of the computer readable instructions, as needed, or some instructions may be executed at computing device 92 and some at computing device 110.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of storing a data set that is associated with an associated data set, the data set having at least one storage factor in a storage set comprising at least two storage components respectively having at least one storage capability on a device having a processor and a storage catalog, the method comprising:
   executing on the processor instructions configured to:
      identify at least one storage factor of the data set;
      among the storage components, select a selected storage component having storage capabilities matching the storage factors of the data set and excluding at least one storage component that is storing the associated data set;
      in the storage catalog, record the selected storage component for the data set; and
      store the data set in the selected storage component according to the storage catalog.

2. The method of claim 1, the storage capabilities of respective storage components selected from a storage capability set comprising:
   a storage component type capability;
   a storage capacity capability;
   a storage access rate capability;
   a storage querying interface capability; and
   a storage security capability.

3. The method of claim 1:
   the device having access to a storage log indicating at least one storage event involving at least one storage component; and
   the instructions configured to evaluate the storage log to identify at least one storage capability of the at least one storage component.

4. The method of claim 1:
   the device having at least one heuristic configured to select a selected storage component having storage capabilities matching the storage factors of the data set; and
   the instructions configured to select a selected storage component for the data set by invoking the at least one heuristic.

5. The method of claim 4:
   the data set comprising a first entity having a relationship with a second entity of a second data set;
   the device comprising an entity relationship specifying the relationship of the first entity with the second entity; and
   the instructions configured to identify at least one storage factor of the storage set according to the entity relationship.

6. The method of claim 5, at least one heuristic configured to select a storage component to store the data set and the second data set.

7. The method of claim 4:
   the device comprising a usage mapping identifying at least one usage of a data set; and
   the instructions configured to identify at least one storage factor of the storage set according to the usage mapping.

8. The method of claim 4:
   the device comprising a logical schema identifying a logical storage structure of the data set; and
   the instructions configured to identify at least one storage factor of the storage set according to the logical schema.

9. The method of claim 4:
   the heuristics including a best-fit selection heuristic; and
   the instructions configured to select storage components for data sets by invoking the best-fit selection heuristic.

10. The method of claim 1:
   the data set having at least two data subsets respectively having at least one storage factor;
   selecting a selected storage component comprising: for respective data subsets, selecting a storage component having storage capabilities matching the storage factors of the data subset;
   associating the data set in the storage catalog with the selected storage component comprising: for respective data subsets, associating the data subset in the storage catalog with the selected storage component selected for the data subset; and
   storing the data set on the selected storage component comprising: for respective subsets, storing the data subset on the selected storage component selected for the data subset.

11. The method of claim 1, the instructions configured to:
after storing the data set, compare the storage capabilities of the selected storage component for storing the data set with the storage capabilities of other storage components of the storage set; and
upon identifying a second storage component having storage capabilities having a higher match with the storage factors of the data set than the storage capabilities of the selected storage component:
relocate the data set to the second storage component, and
update the storage catalog to associate the data set with the second storage component.

12. The method of claim 1, the instructions configured to, upon receiving a notification of an added storage component:
detect at least one storage capability of the added storage component, and
represent the added storage component in the storage catalog.

13. The method of claim 1, the instructions configured to, upon receiving a notification of a removed storage component, remove the removed storage component from the storage catalog.

14. The method of claim 1, the instructions further configured to fulfill a request to access a selected data set from the storage set by:
using the storage catalog and not contrary to the storage catalog, identifying a selected storage component that is storing the selected data set; and
fulfilling the request by accessing the data set in the selected storage component according to the request and not contrary to the storage catalog.

15. The method of claim 14:
the request comprising a query specifying at least two data sets, the first data set stored on a first storage component and the second data set stored on a second selected storage component other than the first selected storage component; and
fulfilling the request comprising: for respective data sets, accessing the selected storage component that is storing the data set according to the query.

16. The method of claim 14:
the request comprising a request to retrieve a data set comprising a first data subset stored on a first storage component and a second data subset stored on a second selected storage component other than the first selected storage component; and
the instructions configured to fulfill the request by:
retrieving the first data subset from the first storage component;
retrieving the second data subset from the second storage component; and
aggregating the first data subset and the second data subset to generate the data set.

17. The method of claim 12, wherein detecting the at least one storage capability of the added storage component comprising: testing the added storage component to identify the at least one storage capability.

18. A method of managing a storage set comprising at least two storage components respectively having at least one storage capability and storing at least one data set having at least one storage factor, the method involving a device having a processor and a storage catalog identifying at least one mapping, respective mappings specifying a first storage component, a selected data set stored in the first storage component, and a first rationale for selecting the storage capabilities for which the first storage component was selected to store the selected data set, the method comprising:
executing on the processor instructions configured to periodically reevaluate the mappings of data sets to storage components by, for respective selected data sets:
comparing the first rationale specified in the mapping of the selected data set to the first storage component with a second mapping of the selected data set to a second storage component; and
upon identifying a second storage component having a second rationale comprising a higher match with the at least one storage factors of the data set than the first storage component specified in the first rationale and absent a request from a user to relocate the data set:
recording in the storage catalog the mapping of the first storage component for the selected data set;
recording in the storage catalog the second rationale for selecting the second storage component for the selected data set, the second rationale specifying the storage capabilities for which the second storage component was selected to store the selected data set instead of the first storage component; and
relocating the data set from the first storage component to the second storage component.

19. A memory device storing instructions that, when executed on a processor of a device having access to a storage catalog and a storage set comprising at least two storage components respectively having at least one storage capability, store in the storage set a data set that is associated with an associated data set, by:
identifying at least one storage factor of the data set;
among the storage components, selecting a selected storage component having storage capabilities matching the storage factors of the data set according to a rationale and excluding at least one storage component that is storing the associated data set;
in the storage catalog, recording the selected storage component for the data set; and
storing the data set in the selected storage component according to the storage catalog.

20. The method of claim 1, recording the selected storage component for the data set further comprising: recording a rationale specifying the storage capabilities for which the selected storage component was selected to store the data set.

* * * * *